US012569968B2

(12) United States Patent
Harrington et al.

(10) Patent No.: US 12,569,968 B2
(45) Date of Patent: Mar. 10, 2026

(54) FASTENER DRIVING TOOL WITH CYLINDRICAL DRIVER

(71) Applicant: Kyocera Senco Industrial Tools, Inc., Cincinnati, OH (US)

(72) Inventors: Henry K. Harrington, Cincinnati, OH (US); Alexander L. Carrier, Columbus, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 3 days.

(21) Appl. No.: 18/599,403

(22) Filed: Mar. 8, 2024

(65) Prior Publication Data

US 2024/0316736 A1 Sep. 26, 2024

Related U.S. Application Data

(60) Provisional application No. 63/454,394, filed on Mar. 24, 2023.

(51) Int. Cl.

*B25C 1/04* (2006.01)
*B25C 1/00* (2006.01)
*B25C 1/06* (2006.01)

(52) U.S. Cl.

CPC .............. *B25C 1/047* (2013.01); *B25C 1/005* (2013.01); *B25C 1/06* (2013.01)

(58) Field of Classification Search

CPC ........... B25C 1/047; B25C 1/005; B25C 1/06; B25C 1/008; B25C 1/041; B25C 5/1658; B25C 1/04; B25C 1/001; B25C 1/182; B25C 1/184; B25C 5/15

See application file for complete search history.

(56) References Cited

U.S. PATENT DOCUMENTS 4,251,017 A * 2/1981 Doyle ..................... B25C 1/003 227/116
10,493,607 B2 12/2019 Jaskot
10,730,172 B2 8/2020 Po
10,800,022 B2 10/2020 Zhao
(Continued)

FOREIGN PATENT DOCUMENTS

CN 111347376 6/2020
CN 211565770 9/2020
(Continued)

OTHER PUBLICATIONS

ISA Int'l Search Report, 11 pages, mailed Aug. 15, 2024.

*Primary Examiner* — Veronica Martin
(74) *Attorney, Agent, or Firm* — Frederick H. Gribbell; Russell F. Gribbell; William E. Crouse

(57) ABSTRACT

A fastener driving tool has a movable elongated cylindrical portion of a driver that sequentially drives fasteners into a substrate. The elongated cylindrical portion of the driver is designed to drive a fastener into a harder substrate, such as concrete. The elongated cylindrical portion of the driver design is able to handle the force of driving into these harder substrates, compared to prior non-cylindrical driver designs. The fastener driving tool also has a magazine with a cutout portion along the magazine's outer housing between a user grip portion and an upper portion of the magazine. This cutout portion allows the tool to be used in a location with limited access, such as a channel.

15 Claims, 16 Drawing Sheets

(56) References Cited

U.S. PATENT DOCUMENTS

| | | | | |
|---|---|---|---|---|
| 11,338,421 | B2 | 5/2022 | Po | |
| 11,400,573 | B2 | 8/2022 | Tan | |
| 11,667,018 | B2 | 6/2023 | Tan et al. | |
| 2009/0050667 | A1* | 2/2009 | Po | B25C 1/005 227/127 |
| 2009/0090759 | A1 | 4/2009 | Leimbach | |
| 2016/0229043 | A1 | 8/2016 | Wyler et al. | |
| 2017/0282341 | A1* | 10/2017 | Wolf | B25C 1/06 |
| 2017/0368671 | A1* | 12/2017 | Jaskot | B25C 1/06 |
| 2018/0178361 | A1 | 6/2018 | Kabbes et al. | |
| 2019/0126453 | A1* | 5/2019 | Po | B25C 1/047 |
| 2019/0375084 | A1 | 12/2019 | Bierdeman et al. | |
| 2021/0008701 | A1 | 1/2021 | Tan et al. | |
| 2022/0063074 | A1 | 3/2022 | Wierzchon | |
| 2022/0241947 | A1* | 8/2022 | Ward | B25C 1/005 |
| 2023/0088831 | A1* | 3/2023 | Tam | B25C 1/06 227/130 |

FOREIGN PATENT DOCUMENTS

| | | |
|---|---|---|
| CN | 217225417 | 8/2022 |
| WO | 2020248531 | 12/2020 |

* cited by examiner

FASTENER DRIVING TOOL WITH CYLINDRICAL DRIVER

CROSS-REFERENCE TO RELATED APPLICATIONS

The present application claims priority to provisional patent application Ser. No. 63/454,394, titled "FASTENER DRIVING TOOL WITH CYLINDRICAL DRIVER," filed on Mar. 24, 2023.

TECHNICAL FIELD

The technology disclosed herein relates generally to linear fastener driving tools and is particularly directed to driver blades which sequentially force fasteners into a workpiece. At least one embodiment is disclosed as a fastener driving tool that has an elongated cylindrical driver portion with a first elongated protrusion (or "first wing") at a first arcuate portion of the driver, and a second elongated protrusion (or "second wing") at a second, opposite arcuate portion of the driver, and the first and second wings (elongated protrusions) exhibit a plurality of spaced apart driver protrusions. The plurality of spaced apart driver protrusions each have a roller (or bearing) and a retaining ring. The roller on each driver protrusion allows for a smoother return stroke when a lifter is actuated (the driver protrusions are "caught" and "lifted" by lifter extensions), and also helps to prevent a possible interference condition (such as a jam).

The tool includes a removably attachable fastener magazine that exhibits a gap portion. The magazine includes a user grip portion, a fulcrum, and a latch portion, and the magazine is rotatably attachable to the tool. The magazine gap is useful for working in raised tight spaces, such as the interior space of a channel.

STATEMENT REGARDING FEDERALLY SPONSORED RESEARCH OR DEVELOPMENT

None.

BACKGROUND

Fastener driving tools are commonly used to drive nails into substrates. Driving a nail into concrete requires a more powerful driving stroke and a sturdier driver, in order for the driver to last for hundreds or thousands of drive strokes without breaking. The typical drivers used in Senco's FUSION® tools exhibit a substantially planar (flat) shape.

A common problem with automatic nailer tools is that the magazine can interfere in certain work spaces, such as inside a channel, or other small raised area. The user must either manipulate the tool within the channel, or use another method to drive a fastener into the channel to secure the channel to a workpiece.

SUMMARY

Accordingly, it is an advantage to provide a driver for a hoseless fastener driving tool, in which the driver exhibits a solid elongated cylindrical portion, a first wing (an elongated protrusion) on one side of the driver, and a second wing (an elongated protrusion) on an opposite side of the driver, and both wings each include a plurality of spaced apart perpendicular protrusions with rollers that are used to lift the driver during a lift stroke.

It is another advantage to provide a driver for a hoseless fastener driving tool, in which the driver exhibits a solid elongated cylindrical portion, a first wing (an elongated protrusion) on one side of the driver, and a second wing (an elongated protrusion) on an opposite side of the driver, and the solid cylindrical portion is used to drive a fastener into a very hard substrate.

It is yet another advantage to provide a magazine for a hoseless fastener driving tool, in which the magazine housing exhibits a cutout (or gap) portion between a user grip portion and an upper portion of the magazine, thereby allowing the nose portion of the tool access into a small work area.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener driving tool is provided, which comprises: an outer housing; a working cylinder that includes a cylindrical sleeve and a movable piston therewithin; a movable driver that is in mechanical communication with the movable piston, the movable driver having a direction of movement between at least a driven position and a ready position, the movable driver including an elongated cylindrical portion, the elongated cylindrical portion encompasses a majority of the total length of the movable driver, the movable driver including a first wing having a plurality of spaced-apart protrusions, the movable driver including a second, opposite wing having a second plurality of spaced-apart protrusions; and a guide body that includes a driver track and an exit end, where a fastener is to be driven.

In accordance with another aspect, a movable driver for use in a fastener driving tool is provided, which comprises: an elongated cylindrical portion that extends from a first end of the movable driver toward a second, opposite end of the movable driver, the elongated cylindrical portion encompassing a majority of a total length of the movable driver, the elongated cylindrical portion including a first longitudinal side and a second, opposite longitudinal side; a first wing portion that extends along at least a portion of the first longitudinal side, the first wing portion having a first longitudinal outer edge; a second wing portion that extends along at least a portion of the second longitudinal side, the second wing portion having a second longitudinal outer edge; a first plurality of spaced-apart protrusions that are positioned along at least a portion of the first longitudinal outer edge of the first wing portion, the first plurality of spaced-apart protrusions protruding at angles that are not parallel to the elongated cylindrical portion; a second plurality of spaced-apart protrusions that are positioned along at least a portion of the second longitudinal outer edge of the second wing portion, the second plurality of spaced-apart protrusions protruding at angles that are not parallel to the elongated cylindrical portion; and an interface portion proximal to the second, opposite end of the movable driver, the interface portion being in mechanical communication with the elongated cylindrical portion.

In accordance with yet another aspect, a magazine for use in a fastener driving tool is provided, in which the magazine comprises: an elongated body that includes a second end for receiving a plurality of fasteners, and a first, opposite end for sequentially dispensing the plurality of fasteners; a fastener guide between the first end and the second end, the fastener guide being sized and shaped to allow a length of fasteners to pass therethrough; a two-piece fastener cover located along an elongated side of the elongated body, the two-piece fastener cover including an upper magazine cover portion and a lower magazine cover portion, with a gap portion therebetween, the upper magazine cover portion being proximal to the first end of the elongated body, and the lower magazine cover portion being proximal to the second end of the elongated body.

In accordance with still another aspect, a method of using a fastener driving tool to secure a U-shaped channel onto a substrate, the U-shaped channel exhibiting a horizontal base portion and two separated vertical walls, the method comprising: providing a fastener driving tool comprising: an outer housing including a fastener exit end; a working cylinder that includes a cylindrical sleeve and a movable piston therewithin; a movable driver that is in mechanical communication with the movable piston at least during a driving stroke, the movable driver having a direction of movement between at least a driven position and a ready position; providing a magazine for use with the tool, the magazine comprising: an elongated body that includes a first end for sequentially dispensing a plurality of fasteners, and a second, opposite end for receiving the plurality of fasteners; a fastener guide between the first end and the second end, the fastener guide being sized and shaped to allow a length of the plurality of fasteners to pass therethrough; a two-piece fastener cover located along an elongated side of the elongated body, the two-piece fastener cover including an upper magazine cover portion and a lower magazine cover portion, with a gap portion therebetween, the upper magazine cover portion being proximal to the first end of the elongated body, and the lower magazine cover portion being proximal to the second end of the elongated body; positioning the fastener exit end between the two separated vertical walls; positioning the gap portion over one of the two separated vertical walls; pushing the fastener exit end against the horizontal base portion; and driving one of the plurality of fasteners through the channel and into the substrate.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1A:
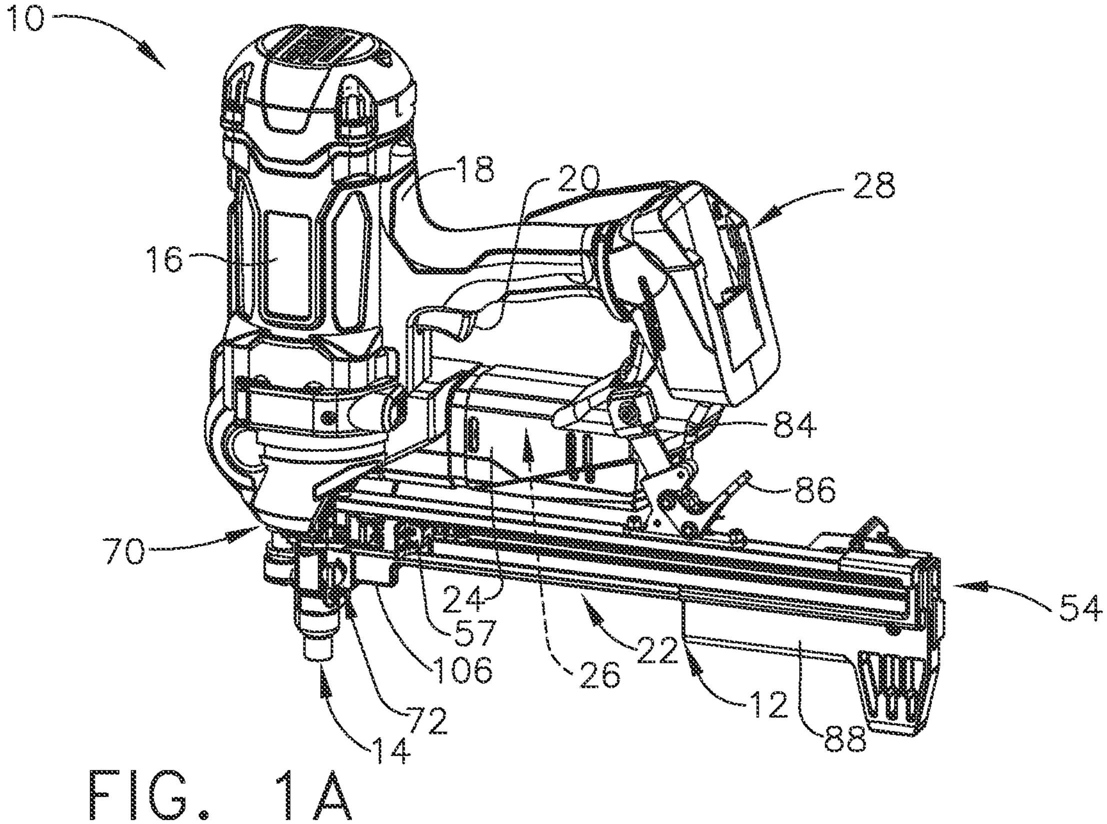
FIG. 1A is a top left perspective view of a fastener driving tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

Referring now to FIG. 1A, a fastener driving tool is generally designated by the reference numeral 10. The tool 10 includes an outer housing 16, a handle portion 18, a user-operated trigger 20, a battery pack connector portion 28, a fastener exit end 14, and a motor 26 mounted inside a motor housing 24. The tool 10 also includes a removably attachable elongated magazine 12, a bracket 84 (also sometimes referred to herein as a "tool latch portion for magazine), a lever 86 (also sometimes referred to herein as a "magazine latch"). The magazine 12 itself includes a lower magazine cover portion 88 (to be used as a human user's grip portion), a magazine second (bottom) end 54, a magazine first (top) end 56 (see FIGS. 3-4), and a fastener guide 21 therebetween; also, a pusher 57, and a magazine housing cutout (or magazine cover "gap" portion) 22.

The magazine 12 is attachable to the tool 10 proximal to the magazine first end 56, and secured using the lever 86 and the bracket 84. The magazine is loaded with a plurality of fasteners by inserting them into the magazine second end 54, and the fasteners sequentially exit the magazine 12 and into the tool 10 at the magazine first end 56 during a driving stroke. A front plate 70 mounted proximal to the exit end 14 of the tool 10, and a rear plate 72 mounted proximal to the magazine first end 56 form a guide body 46 (see FIGS. 3-4) to direct a fastener toward the exit end 14 during a driving stroke.

Figure 1B:
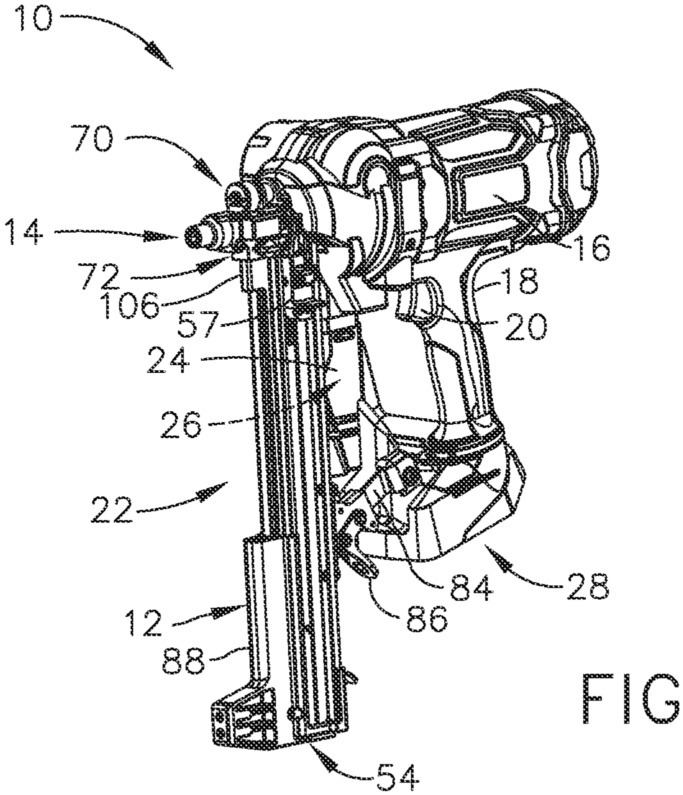
FIG. 1B is a bottom left perspective view of the tool of FIG. 1A, in which the magazine is loaded with a plurality of shorter fasteners.

Referring now to FIG. 1B, the tool 10 and the magazine cutout portion 22 is shown in a front perspective view. A portion of the magazine housing is removed to form the cutout portion 22, which extends between the grip portion 88 and an upper magazine cover portion 106. It should be noted that the upper magazine cover portion 106 is not a part of the rear plate 72, and does not form part of the guide body 46, but instead the upper magazine cover portion 106 partially forms the entire upper portion of the magazine that holds the plurality of fasteners and the pusher 57.

Figure 3:
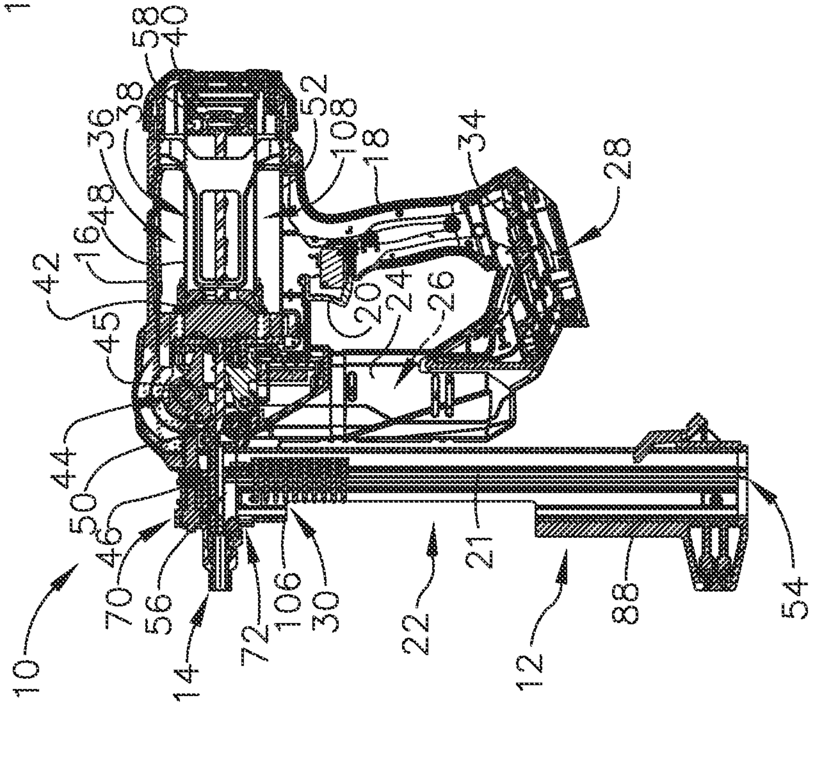
FIG. 3 is a left side cutaway view along the line 3-3 of the tool of FIG. 2, in which the magazine is loaded with a plurality of shorter fasteners.

Describing the construction of the magazine 12 in general, it includes a two-piece fastener cover, made up by the lower magazine cover portion 88 and the upper magazine cover portion 106. The two pieces 88 and 106 of the magazine cover portions are located along an elongated side of the elongated body, which is along the "front" side of the magazine (or, to the left, as seen in FIG. 3). These two cover pieces 88 and 106 are separated by the "gap" portion 22, which provides advantages that will be described hereinbelow. As can be seen in the drawings, the upper magazine cover portion is proximal to the first end 56 of the elongated body, and the lower magazine cover portion is proximal to the second end 54 of the elongated body.

Figure 2:
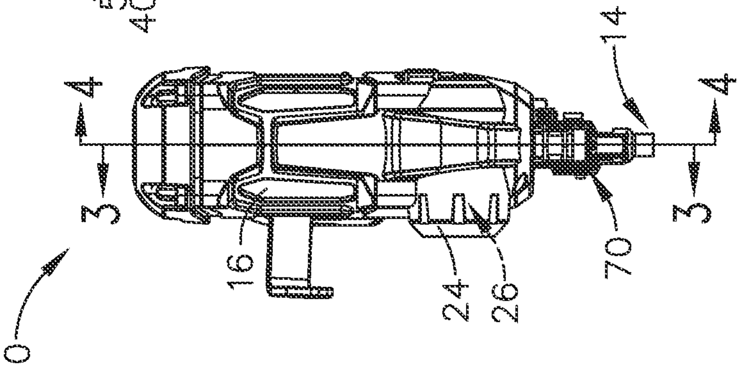
FIG. 2 is a front plan view of the tool of FIG. 1A.

Referring now to FIG. 2, the motor housing 24 is shown mounted on the right side of the tool 10. The upper plate 70 and the exit end 14 are also illustrated.

Referring now to FIG. 3, a cutaway view of the tool 10 along the line 3-3 of FIG. 2 is illustrated. In FIG. 3, the magazine 12 is holding a plurality of short fasteners 30, although the magazine 12 is configured to hold long fasteners 32 as well (see FIGS. 32-33). The tool 10 has a printed circuit board (PCB) 34 with a system controller, and the system controller controls certain functions of the tool.

The tool 10 of the illustrated embodiment uses a gas spring to perform a driving stroke. Compressed gas is stored in a main pressurized storage chamber 36 having an outer wall 52. A working cylinder 108 has an outer wall 48 (also sometimes referred to herein as a "cylinder sleeve"), and contains a movable piston 58 and a movable driver 50 therewithin. The compressed gas above the piston 58 is defined herein as a variable displacement volume 40, and this variable displacement volume does not vent to atmosphere, but is reused for hundreds or thousands of drive strokes. The gas beneath the piston 58 is defined herein as a variable venting volume 38, and the variable venting volume exhausts to atmosphere after each driving stroke. The tool 10 also includes a bumper (or piston stop) 42, a lifter subassembly (S/A) 44, and a latch 45. The latch 45 is configured to hold the driver 50 from moving 'backward' during a return stroke.

The storage chamber 36 is in fluidic communication with the working cylinder 108 and is charged with a pressurized gas. This pressurized gas, under the appropriate operating conditions, will cause the movable piston 58 to move through a driving stroke toward the driven position. In the design of the illustrated embodiment (which is a Senco FUSION® nailer tool), that pressurized gas is not vented to atmosphere after a driving stroke, but instead the pressurized gas is re-used for a plurality of operating cycles. It will be understood that many of design engineering principles described herein are applicable to a standard 'air tool' in which the pressurized gas (e.g., compressed air) is not re-used, but instead is vented to atmosphere after each driving stroke.

Figure 4:
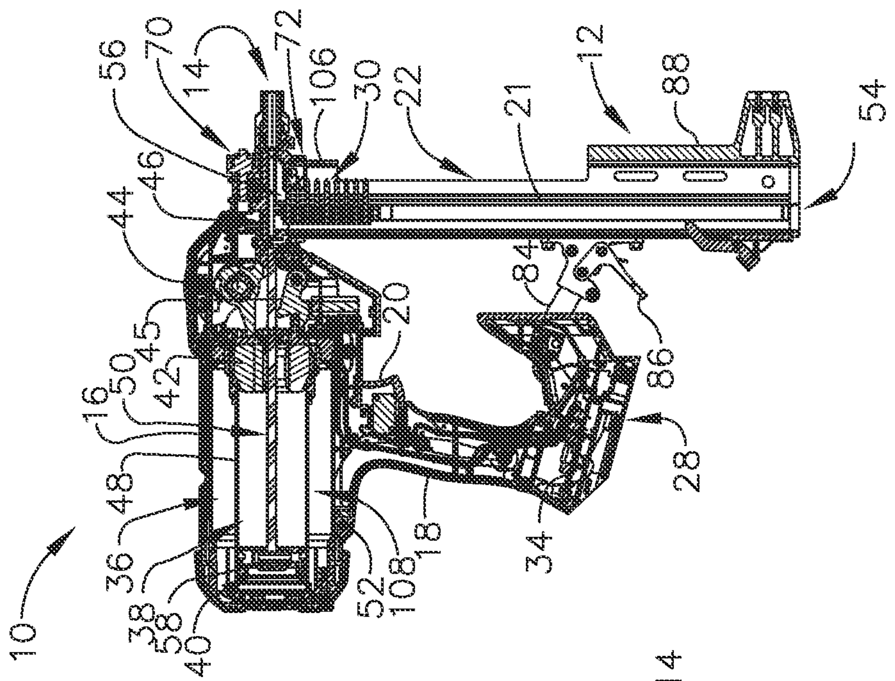
FIG. 4 is a right side cutaway view along the line 4-4 of the tool of FIG. 2, in which the magazine is loaded with a plurality of shorter fasteners.
Figure 32:
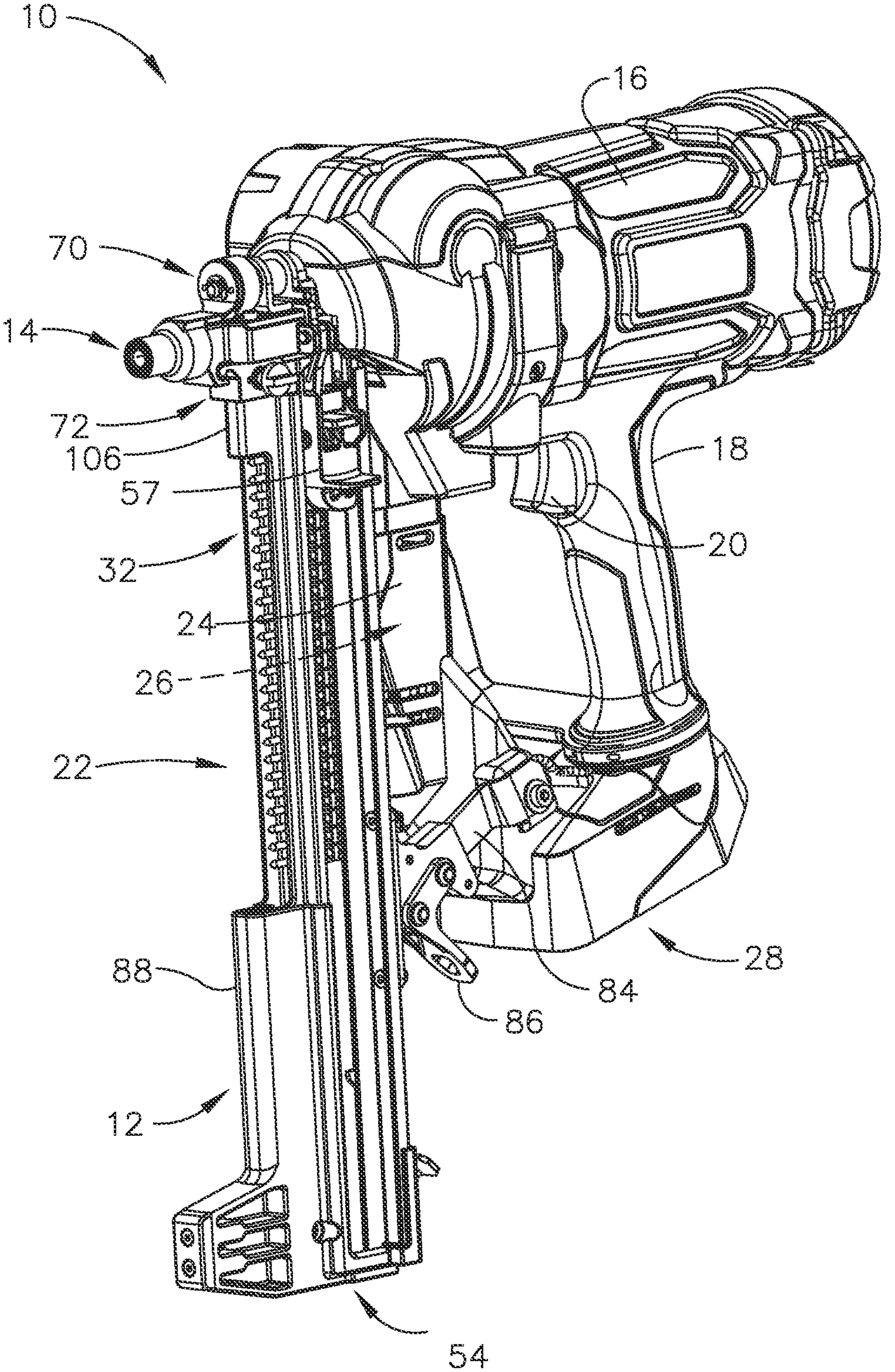
FIG. 32 is a bottom left perspective view of the tool of FIG. 1A, in which the magazine is loaded with a plurality of longer fasteners.
Figure 33:
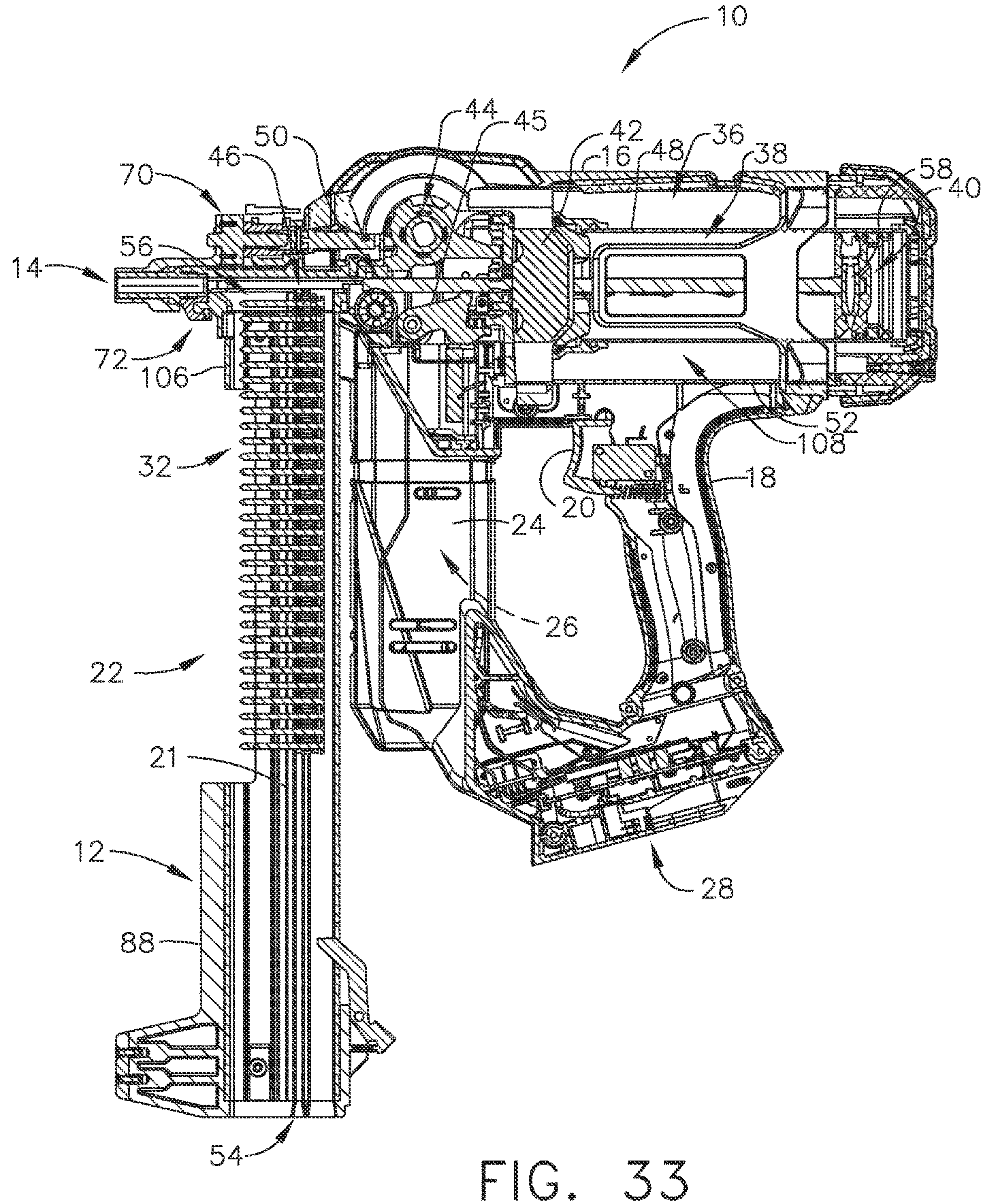
FIG. 33 is a right side cutaway view of the tool of FIG. 1A, in which the magazine is loaded with a plurality of longer fasteners.

Referring now to FIG. 4, the plurality of short fasteners 30 are shown loaded in the magazine 12. The short fasteners 30 do not extend past the magazine housing cutout portion 22. However, the long fasteners 32 do extend past the magazine housing cutout portion 22, as depicted in FIGS. 32-33.

Figure 5:
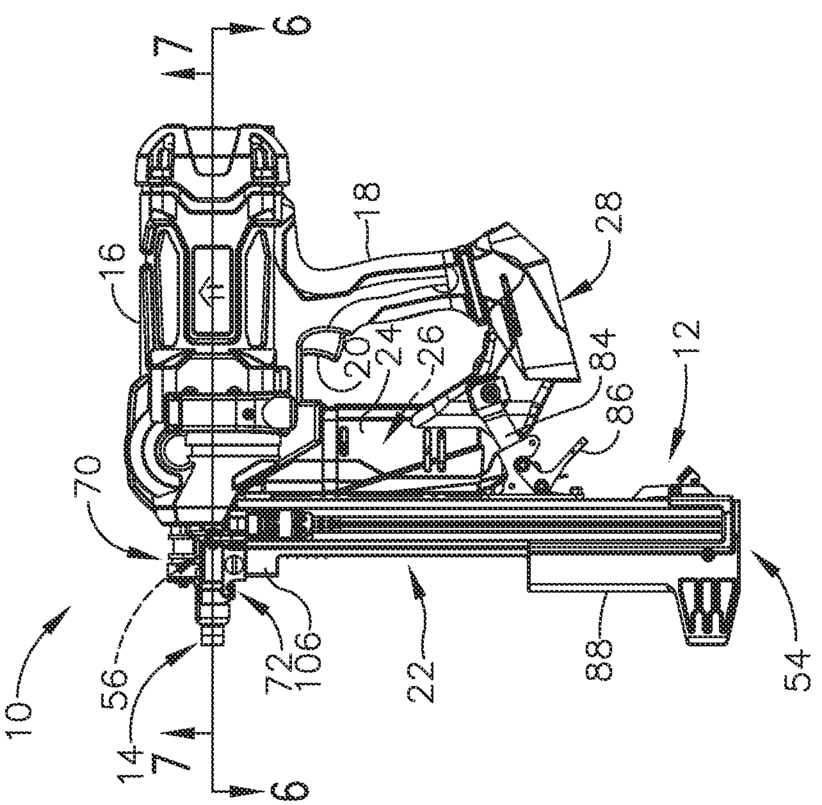
FIG. 5 is a left side plan view of the tool of FIG. 1A.

Referring now to FIG. 5, the grip portion 88 is shown extending to nearly one third of the entire length of the magazine 12. This is to provide an extended safe gripping portion for when a user wants to detach, or re-attach, the magazine 12 to the tool 10. If the magazine 12 is loaded with short fasteners 30 (as in FIGS. 3, 4, and 5), then a user could also grip the cutout portion 22. However, if the magazine 12 is loaded with long fasteners 32, the user would probably not want to grip the cutout portion 22, since the fasteners will be partially extending from the cutout portion (see FIGS. 32-33).

Figure 6:
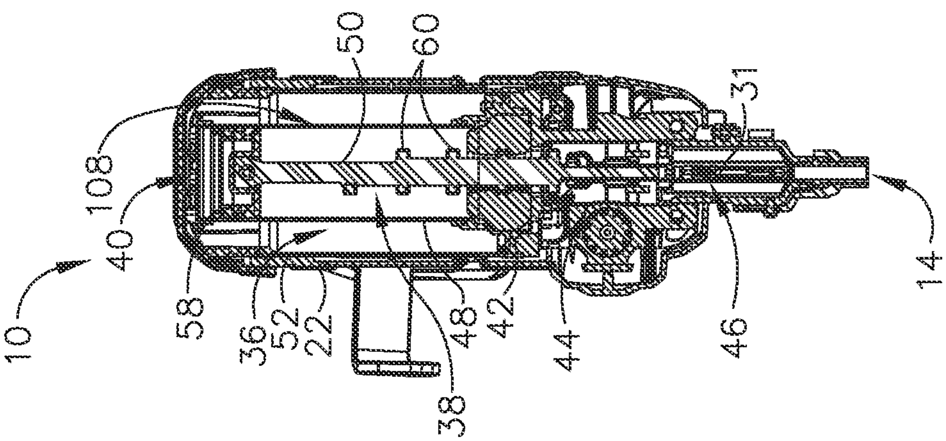
FIG. 6 is a front elevation cutaway view along the line 6-6 of FIG. 5.

Referring now to FIG. 6, the tool 10 is shown in a cutaway view along the line 6-6 of FIG. 5. In this view, the driver 50 of the tool 10 is at a "ready position;" in other words, the tool is primed to begin a driving stroke. The piston 58 is located in a distal position from the bumper 42, and a fastener 31 is loaded in the guide body 46.

When the latch 45 is released, the compressed gas quickly forces the piston 58 and the driver 50 "down" (in this view), and drives the fastener 31 out of the exit end 14 and into a substrate. The piston 58 reaches a driven position proximal to the bumper 42. At this point, the lifter S/A 44 begins a return stroke, and forces the driver 50 and the piston 58 back toward the ready position. As described herein, it is clear that the movable driver 50 has a direction of movement between at least the driven position and the ready position.

Figure 7:
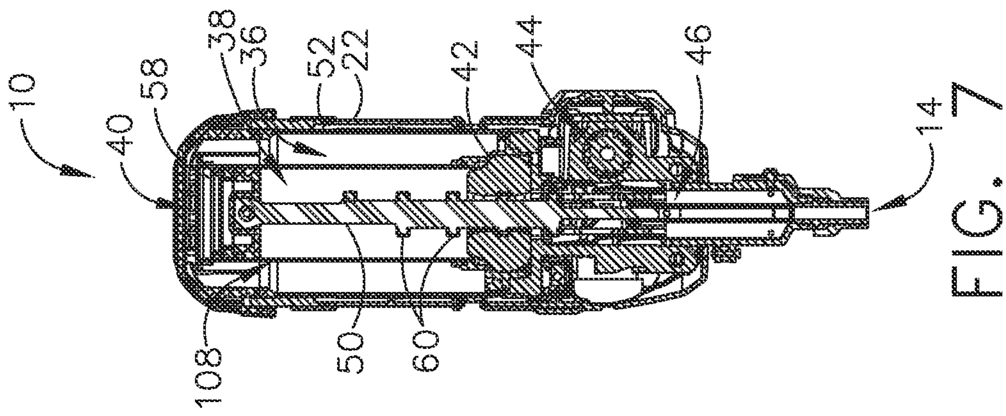
FIG. 7 is a rear elevation cutaway view along the line 7-7 of FIG. 5.

Referring now to FIG. 7, the tool 10 is shown in a cutaway view along the line 7-7 of FIG. 5. In this view, a plurality of spaced-apart protrusions sub-assemblies ("S/A") 60 are depicted on each side of the driver 50 (note that these protrusions S/A 60 are also illustrated on FIG. 6). These protrusions S/A's 60 are "caught" by the lifter S/A 44, and used to "lift" the driver 50 back toward a ready position after a driving stroke.

Figure 8:
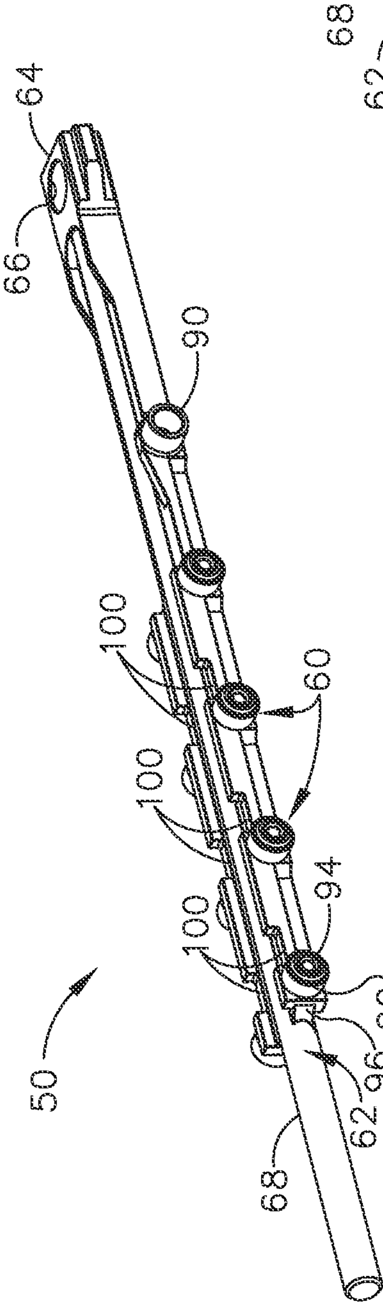
FIG. 8 is a right perspective view of a driver for the tool of FIG. 1A.

Referring now to FIG. 8, the driver 50 is illustrated without the rest of the tool 10, and includes an 'interface portion' that includes a piston mounting portion 64 and a through hole 66, and both the mounting portion 64 and the through hole 66 are used to secure the driver 50 to the piston 58 (see FIGS. 20-24). The driver 50 has an elongated cylindrical portion 68 that runs almost the entire length of the driver 50, and the driver 50 exhibits a first elongated arcuate portion 62 and a second elongated arcuate portion 63 on the opposite side of the driver (see FIG. 12).

Figure 12:
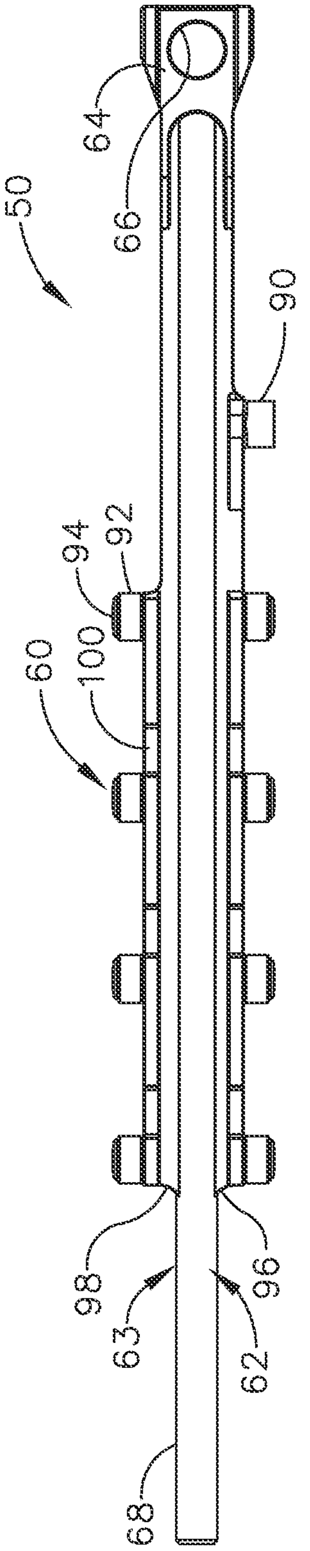
FIG. 12 is a rear elevation view of the driver of FIG. 8.

At the first elongated arcuate portion 62 is a first "wing" (or elongated protrusion) 96, and at the second elongated arcuate portion 63 is a second "wing" (or elongated protrusion) 98 (see FIG. 12). Both the first wing 96 and the second wing 98 exhibit a plurality of evenly-spaced apart grooves (or notches) 100. The driver latch 45 sequentially slides into the grooves 100 (as the driver 50 is "lifted" towards the right in this view) during a return stroke in order to prevent the driver 50 from accidentally moving in the driving direction for more than a very short distance.

Both the first wing 96 and the second wing 98 also exhibit the plurality of spaced-apart driver protrusions S/A's 60. Each protrusion S/A 60 includes a perpendicular driver protrusion (see FIG. 9), a roller (or bearing) 92 and a retaining ring 94. The first wing 96 further exhibits a holder 90 proximal to the mounting portion 64, and a magnet 91 can be mounted in the holder 90 (see FIGS. 23-24).

The driver 50 is preferably machined into the shape depicted in FIG. 8, and it should be noted that the elongated cylindrical portion 68 is preferably solid. However, the driver manufacturing method is left to the designer, as is the material used for the driver, and other manufacturing methods and materials are contemplated by the inventors.

Figure 9:
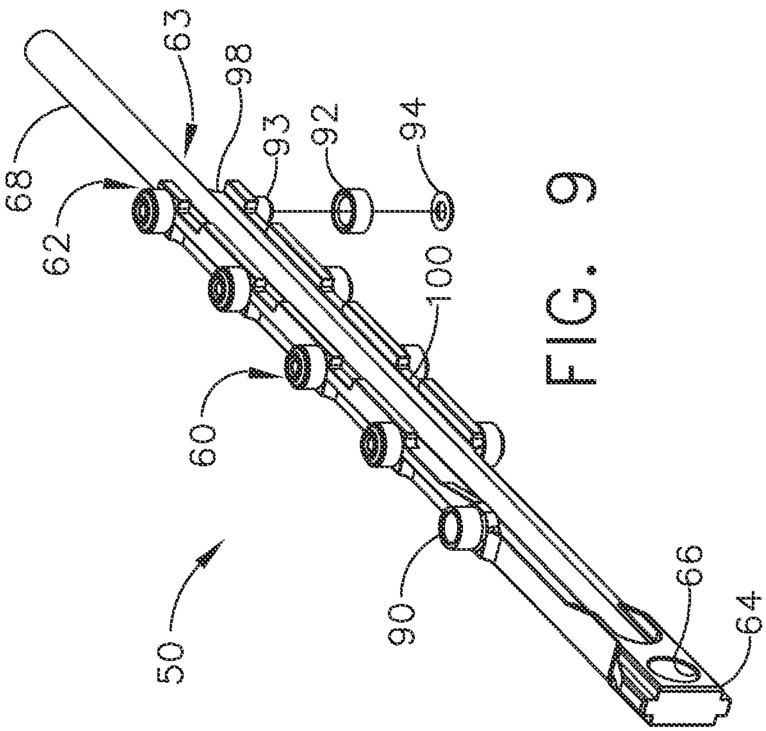
FIG. 9 is a rear perspective view of the driver of FIG. 8, showing a partially exploded bearing and retainer ring.

Referring now to FIG. 9, one of the rollers 92 and one of the retaining rings 94 are illustrated partially exploded from the driver 50. The plurality of retaining rings 94 are used to secure the plurality of bearings 92 onto the plurality of perpendicular driver protrusions 93.

Figure 10:
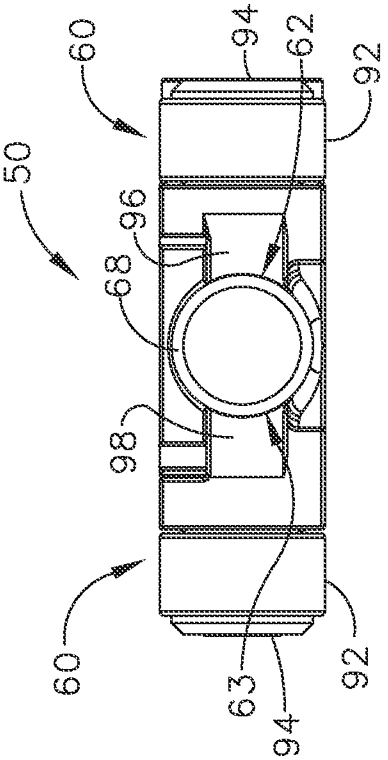
FIG. 10 is bottom plan view of the driver of FIG. 8.

Referring now to FIG. 10, the driver 50 is illustrated in a bottom plan view. The elongated cylindrical portion 68 is shown having the first wing 96 and the second wing 98 on opposite sides of the driver 50. One set of driver protrusions S/A 60 are shown, and both driver protrusions include a roller 92 and a retaining ring 94.

Figure 11:
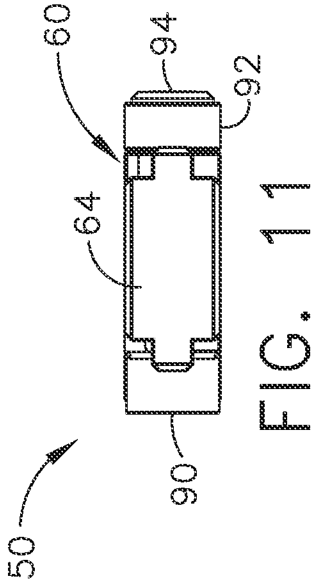
FIG. 11 is a top plan view of the driver of FIG. 8.

Referring now to FIG. 11, the driver 50 is illustrated in a top plan view. The mounting portion 64 encompasses a majority of the driver 50 in this view, and one driver protrusion S/A 60 is shown one side of the driver 50, and the holder 90 is shown on the opposite side of the driver.

Referring now to FIG. 12, a rear elevation view of the driver 50 is depicted. The plurality of latch grooves 100 are depicted, and the full length of the elongated cylindrical portion 68, the first wing 96, and the second wing 98 are illustrated in this view. As can be seen in these views (e.g., FIGS. 20-24), the wings 96 and 98 are generally planar in shape throughout their elongated lengths along the side arcuate portions of the driver 50; however, a portion of the wings 96 and 98—between the multiple perpendicular protrusion subassemblies 60—extend farther out to the sides, and there are some notches (or grooves) 100 along the rear surfaces of both wings that somewhat interrupt the generally planar shapes at that portion of the wings. (Those notches/grooves 100 are designed to engage with the driver latch 45 during a lifting stroke, if necessary, or at the "ready" position of the driver.)

Figure 13:
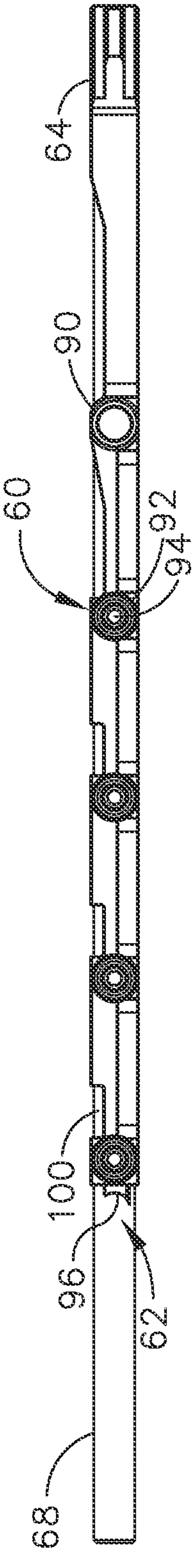
FIG. 13 is a right side elevation view of the driver of FIG. 8.

Referring now to FIG. 13, the right side (upside down) of the driver 50 is shown with the plurality of latch grooves 100 facing "up" (in this view). FIG. 13 also depicts the plurality of rollers 92 individually mounted on several perpendicular driver protrusions 93, and each roller 92 is individually secured by a retaining ring 94.

Figure 14:
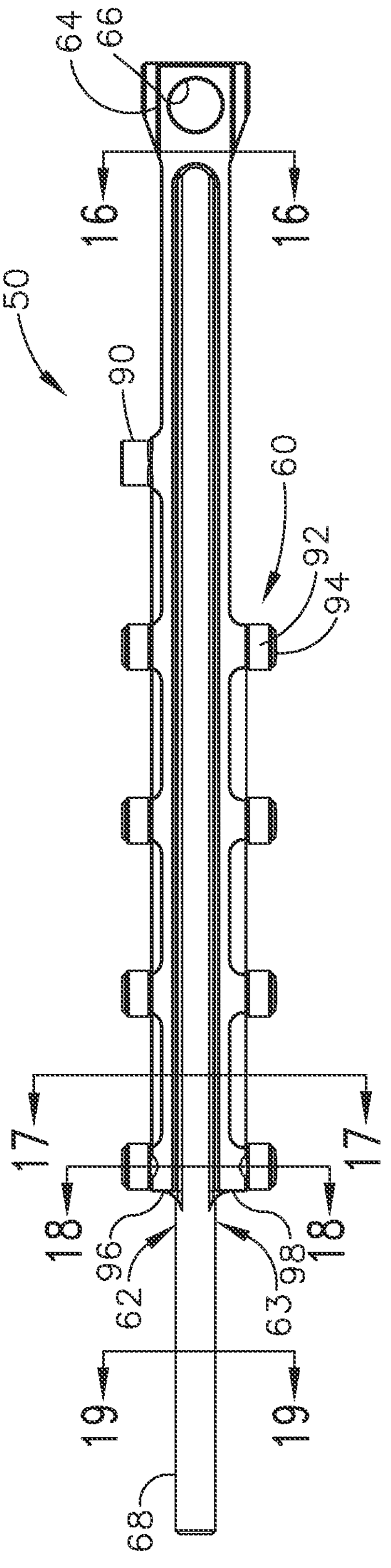
FIG. 14 is a front elevation view of the driver of FIG. 8.

Referring now to FIG. 14, a front elevation view of the driver 50 is depicted. This side of the driver 50 is relatively smooth, exhibiting no latch grooves. Several section views are taken from this figure.

Figure 15:
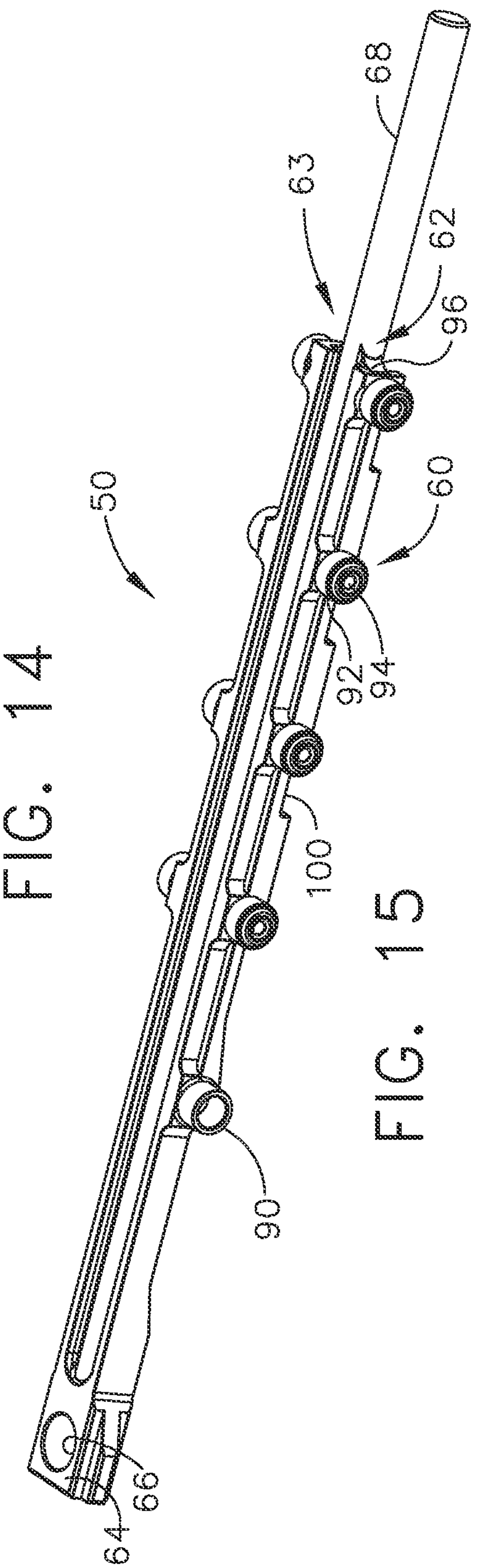
FIG. 15 is a front right perspective view of the driver of FIG. 8.

Referring now to FIG. 15, the front side of the driver 50 is depicted in a perspective view. As noted above, the front side of the driver 50 is relatively smooth, because the plurality of latch grooves 100 are located on the rear side of the driver. It should be noted that the elongated cylindrical portion 68 is very strong, and should be designed to withstand the rigors of several thousands of driving cycles. The driver 50 includes the elongated cylindrical portion 68 because the tool 10 is preferably used to drive relatively large nails into concrete. Of course, the driver design can be used in any fastener driving tool, but the rugged construction of the driver 50 illustrated herein is particularly suited for work driving fasteners into harder substances, such as concrete, for example.

Figure 16:
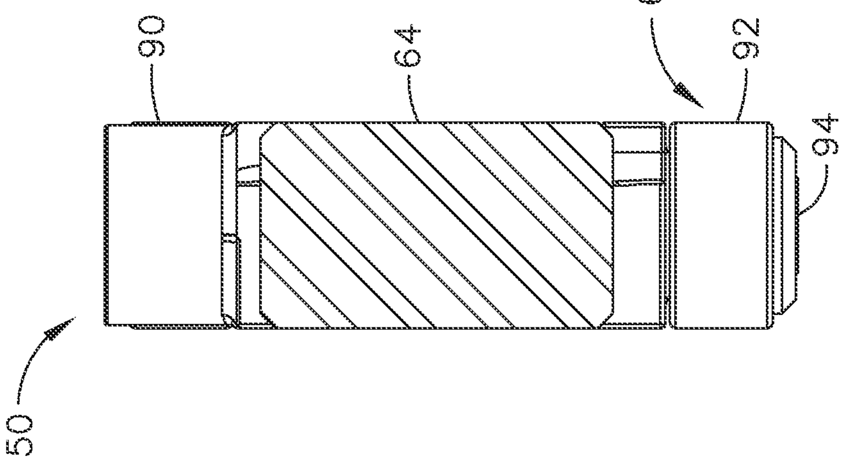
FIG. 16 is a cutaway view along the line 16-16 of the driver of FIG. 14.

Referring now to FIG. 16, the driver 50 is depicted in a cutaway view along the line 16-16 of FIG. 14. As can be seen, the driver 50 is constructed of a solid material, preferably metal.

Figure 17:
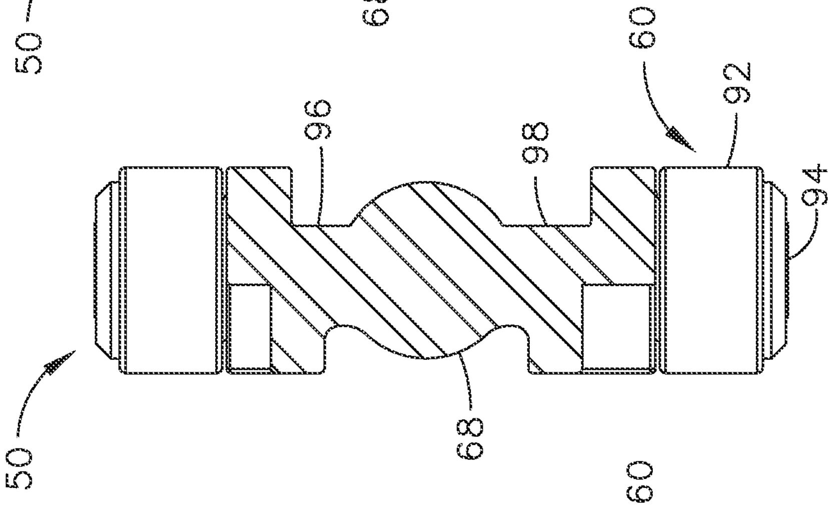
FIG. 17 is a cutaway view along the line 17-17 of the driver of FIG. 14.

Referring now to FIG. 17, the driver 50 is depicted in a cutaway view along the line 17-17 of FIG. 14. As mentioned above, the driver 50 is shown constructed of a solid material in this cutaway view show an outer rectilinear structure, and is preferably constructed of a metal such as steel, for example.

Figure 18:
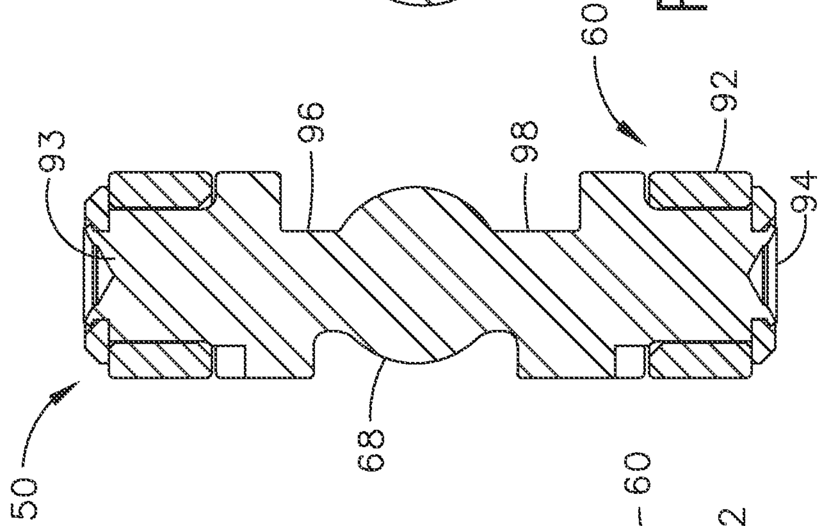
FIG. 18 is a cutaway view along the line 18-18 of the driver of FIG. 14.

Referring now to FIG. 18, the driver 50 is depicted in a cutaway view along the line 18-18 of FIG. 14. In this view, the driver 50 is shown having the outer rectilinear structure that is constructed of a solid material, but note that the perpendicular driver protrusions 93 are also shown constructed of a solid material, preferably the same material as the rest of the driver.

Figure 19:
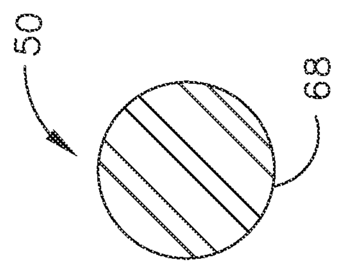
FIG. 19 is a cutaway view along the line 19-19 of the driver of FIG. 14.

Referring now to FIG. 19, the driver 50 is depicted in a cutaway view along the line 19-19 of FIG. 14. In this view, only the elongated cylindrical portion 68 is shown, and it is constructed of a solid material as well, preferably steel. As noted above, the preferred construction technique is to machine the entire driver 50 from a single piece of relatively strong and tough material, such as steel.

Figure 20:
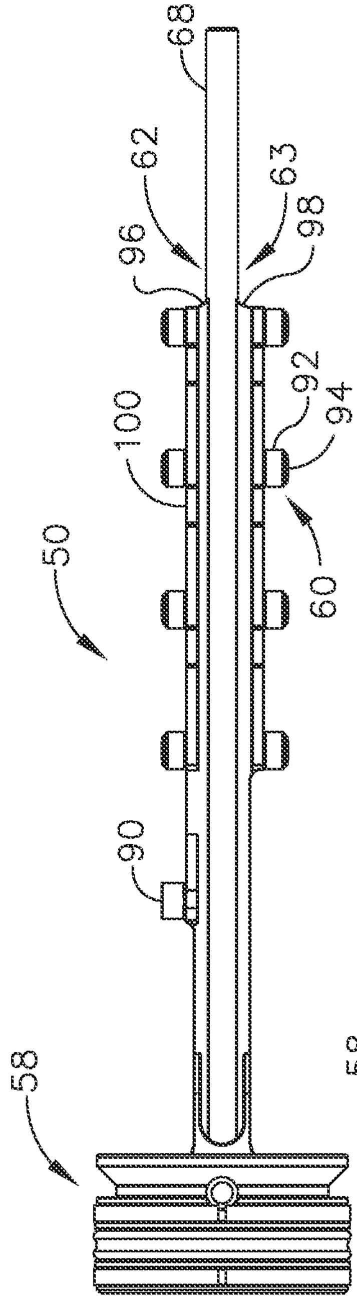
FIG. 20 is a rear elevation view of the driver of FIG. 8, including a piston.
Figure 21:
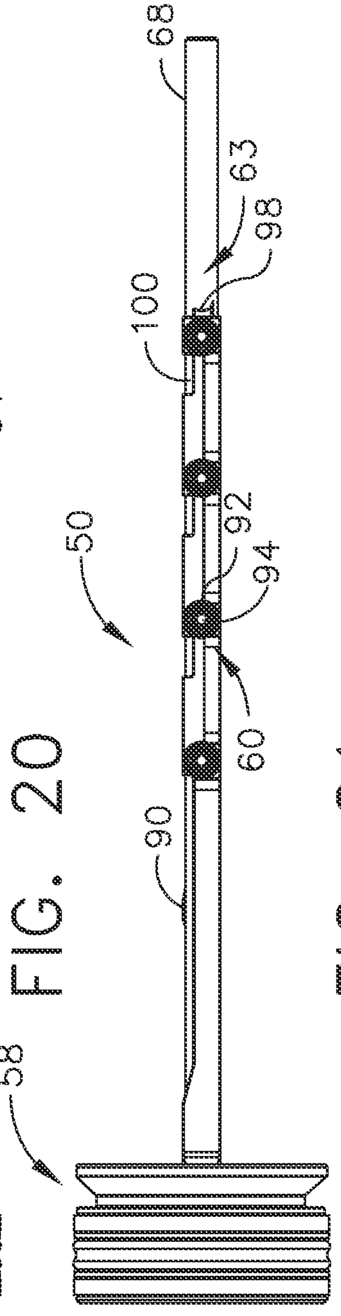
FIG. 21 is a left side plan view of the driver and piston of FIG. 20.
Figure 22:
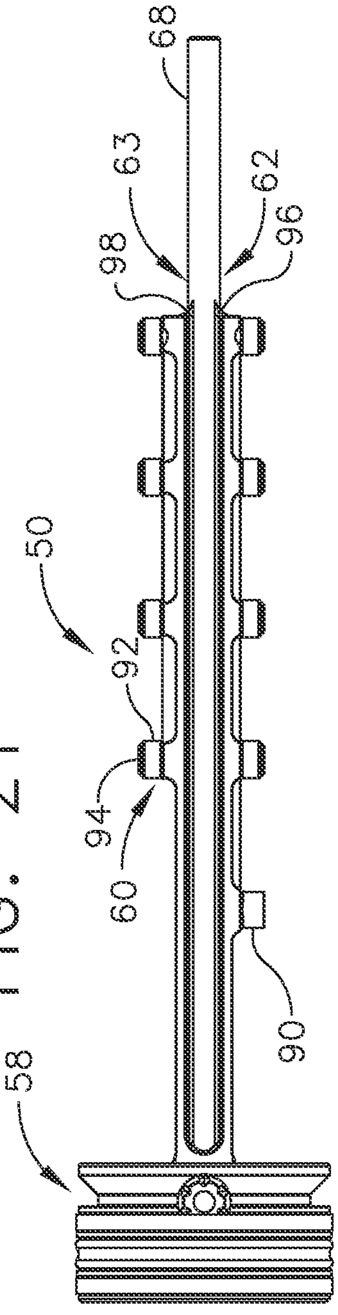
FIG. 22 is a front elevation view of the driver and piston of FIG. 20.

Referring now to FIG. 20, the piston 58 and the driver 50 are shown in a rear view. The piston 58 is securely attached to the driver 50 at the mounting portion 64. FIG. 21 depicts the piston 58 and the driver 50 in a left side view, and FIG. 22 depicts the piston 58 and the driver 50 in a top view.

Figure 23:
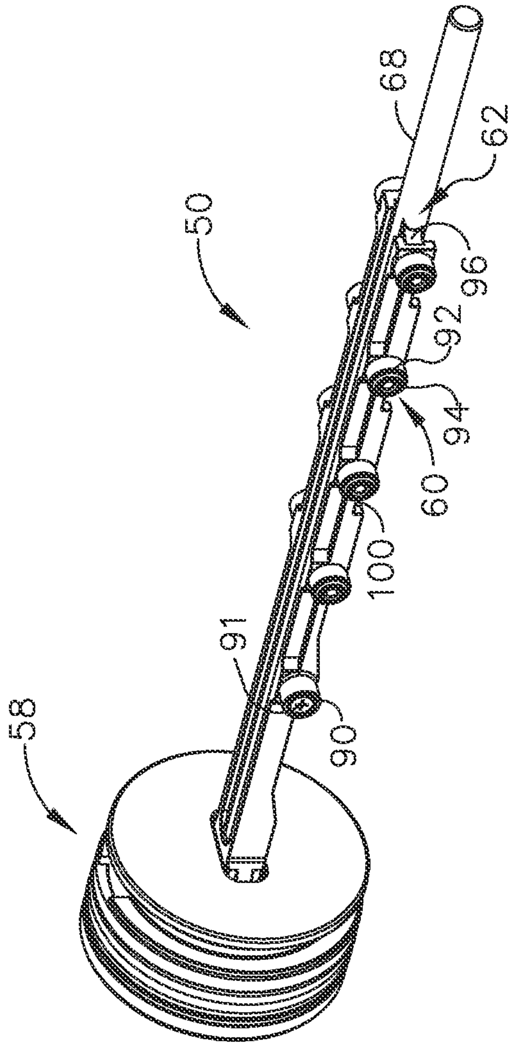
FIG. 23 is a bottom right front perspective view of the driver and piston of FIG. 20.
Figure 24:
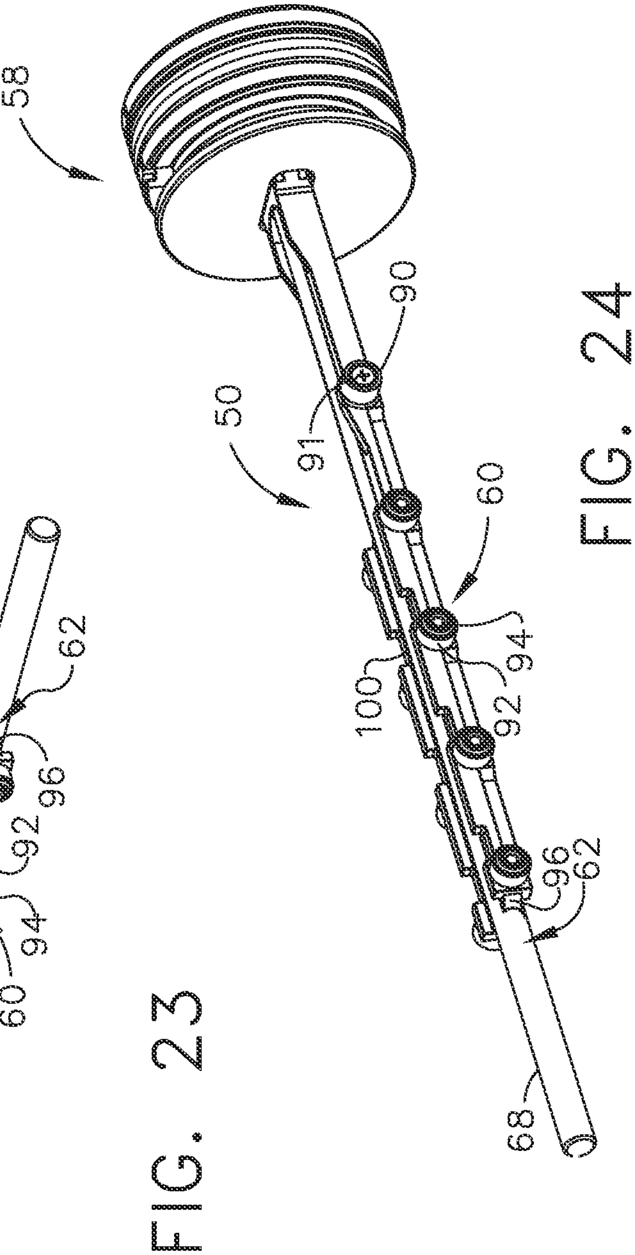
FIG. 24 is a bottom right rear perspective view of the driver and piston of FIG. 20.

Referring now to FIG. 23, the piston 58 and the driver 50 are shown in a bottom right front perspective view, and in FIG. 24 the piston 58 and the driver 50 are shown in a bottom right rear perspective view. In FIGS. 23 and 24, the magnet 91 is shown mounted inside the holder 90.

Figure 25:
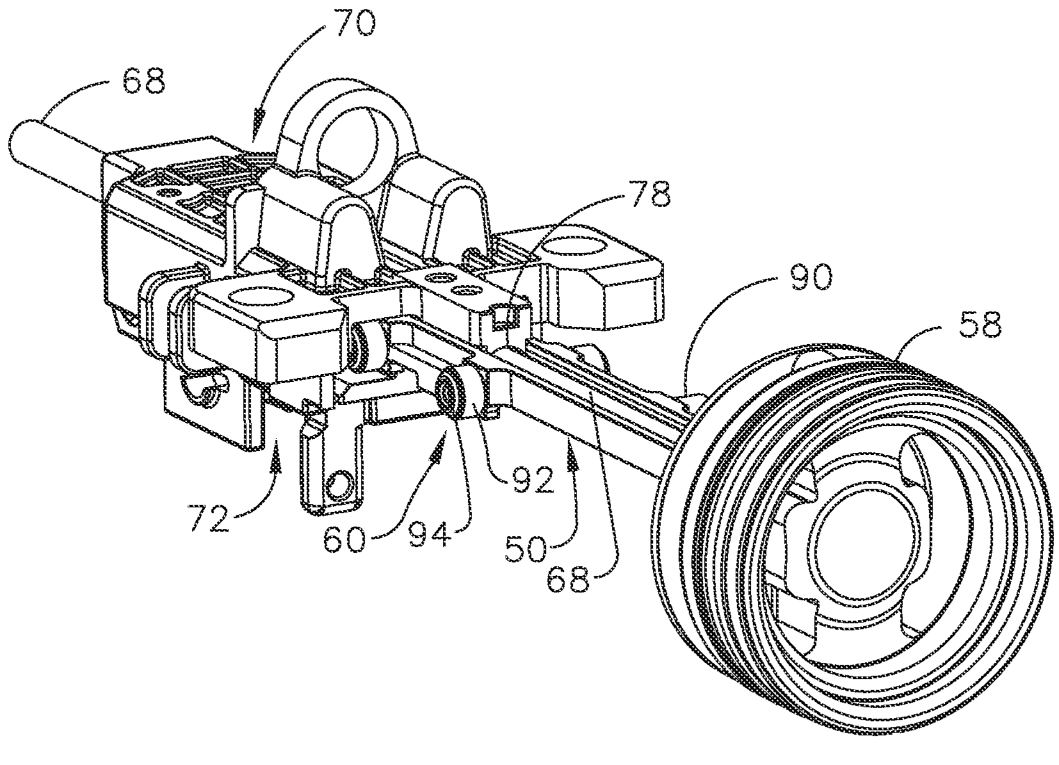
FIG. 25 is a top left front perspective view of driver and piston of FIG. 20, including a front plate of the tool and a rear plate of a magazine for the tool of FIG. 1A.

Referring now to FIG. 25, the piston 58, the driver 50, the front plate 70, and the rear plate 72 are depicted in a top perspective view. FIG. 25 shows the front plate 70 and the rear plate 72 in an assembled state, with the driver 50 positioned in a curved portion of a driver track 78 (see FIG. 26). During a drive stroke, the driver 50 and the piston 58 slide towards the exit end 14 when the variable displacement volume 40 forces the piston 58 towards the exit end. In a return stroke, the driver 50 slides through the driver track portion 78 when the lifter S/A 44 "lifts" the driver back toward the ready position.

Figure 26:
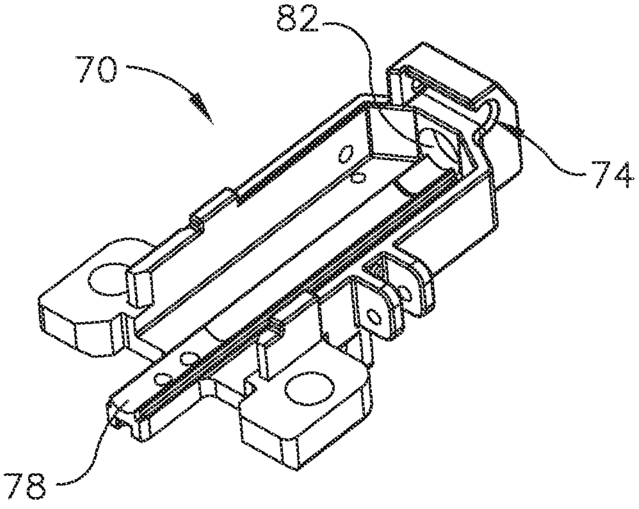
FIG. 26 is a rear left perspective view of the front plate of the tool of FIG. 1A.

Referring now to FIG. 26, the front plate 70 is depicted showing a curved portion of the driver track 78. The front plate 70 includes a rounded receptacle 74 and an opening 82 for the front portion of the driver 50.

Figure 27:
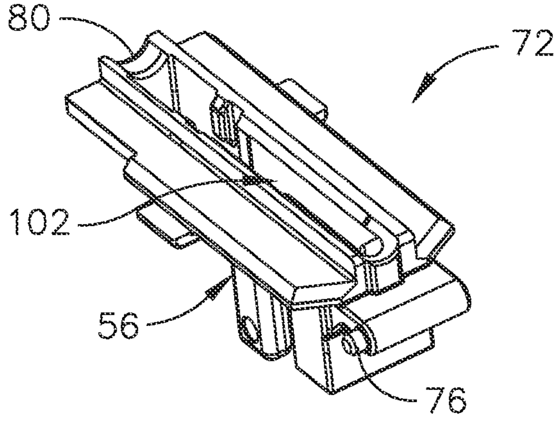
FIG. 27 is a front right perspective view of the rear plate of the magazine of FIG. 1A.

Referring now to FIG. 27, the rear plate 72 is depicted, showing a fastener feed gap 102, a curved portion of the driver track 80, and a fulcrum 76. A user positions the fulcrum 76 into the rounded receptacle 74 and "swings" the magazine towards the tool 10, and then secures the magazine to the tool by clipping the lever 86 onto the bracket 84. During each drive stroke, the magazine 12 sequentially feeds fasteners 30, 32 into the guide body 46, and each fastener travels through the feed gap 102 and sits in the driver track 78,80, until the driver 50 pushes the single fastener into a substrate.

Figure 28:
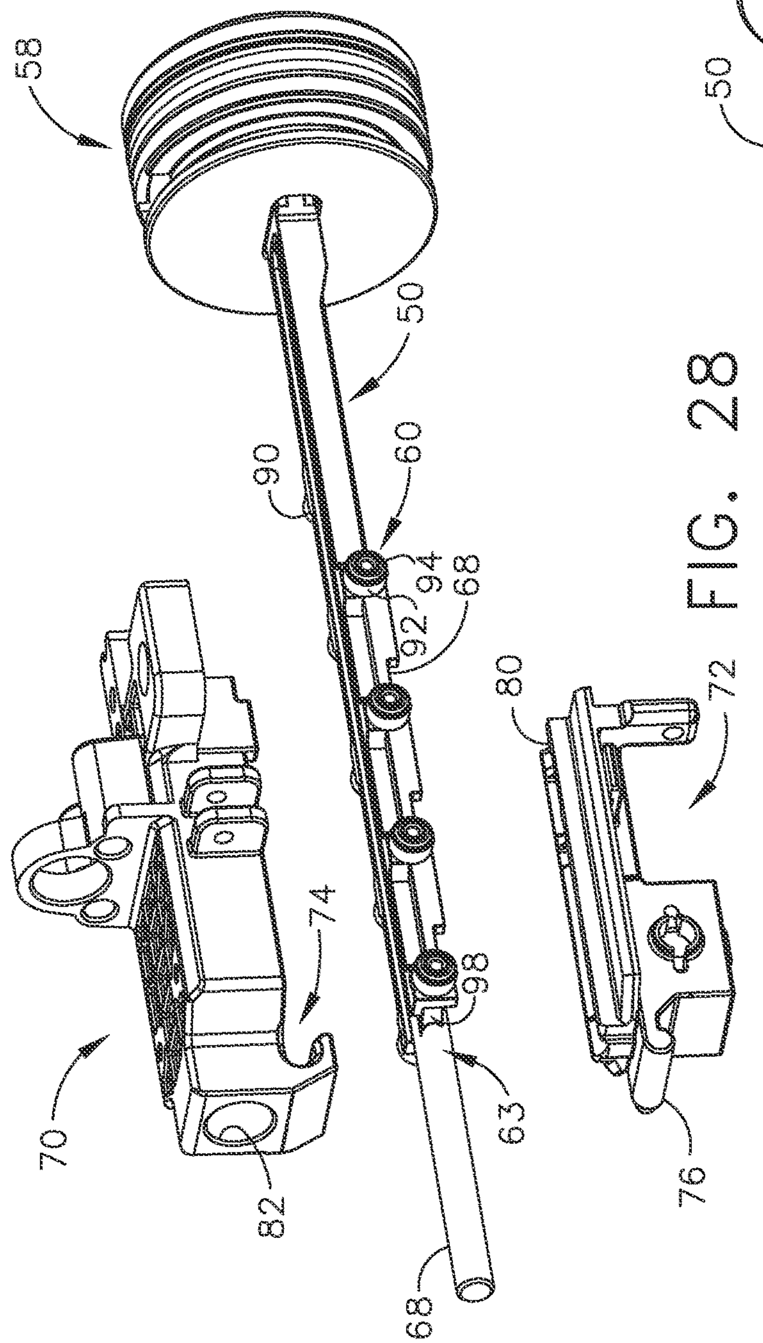
FIG. 28 is a bottom left front perspective view of the driver, piston, front plate, and rear plate of the tool of FIG. 1A, showing the front plate and the rear plate exploded from the driver and piston.

Referring now to FIG. 28, the front plate 70 and the rear plate 72 are shown partially exploded from the driver 50 and the piston 58. The driver 50 slides along the driver track portion 78 and the driver track portion 80, such that the driver 50 typically does not contact the opening 82 during normal operations. In other words, a first curved portion 78 and a second, opposite, curved portion 80 are sized and shaped to direct the elongated cylindrical portion 68 of the movable driver 50 during at least a driving stroke.

Figure 29:
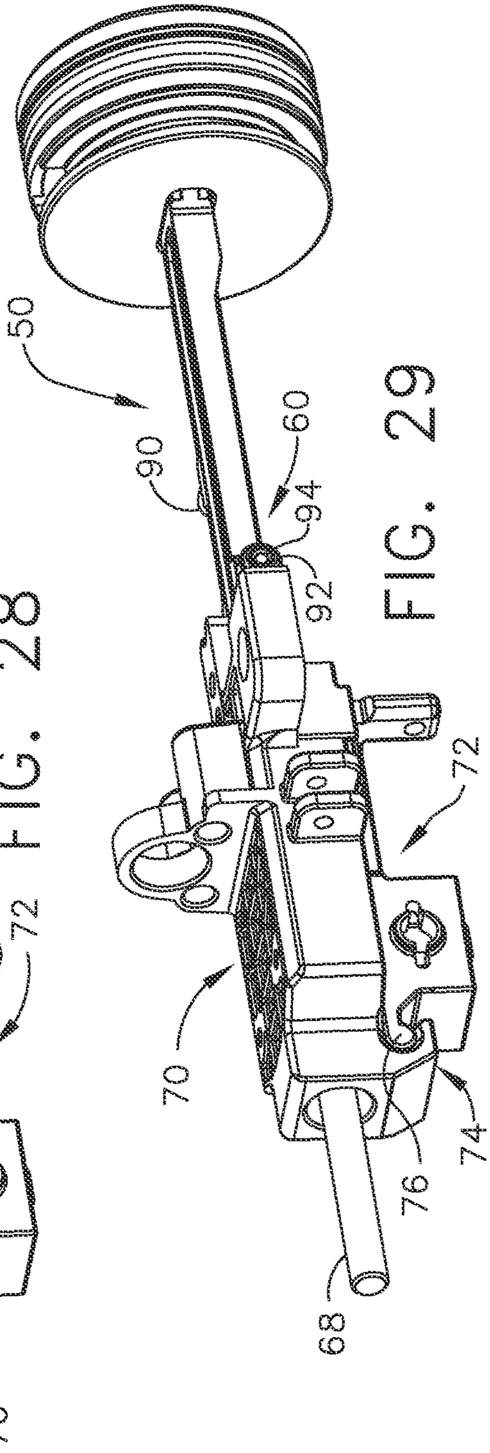
FIG. 29 is a bottom left front perspective view of the driver, piston, front plate, and rear plate of the tool of FIG. 1A.

Referring now to FIG. 29, the front plate 70, the rear plate 72, the driver 50, and the piston 58 are shown in a front perspective view. In FIG. 29, the driver 50 is shown not in contact with the opening 82, and the fulcrum 76 is mounted in the rounded receptacle 74.

Figure 30:
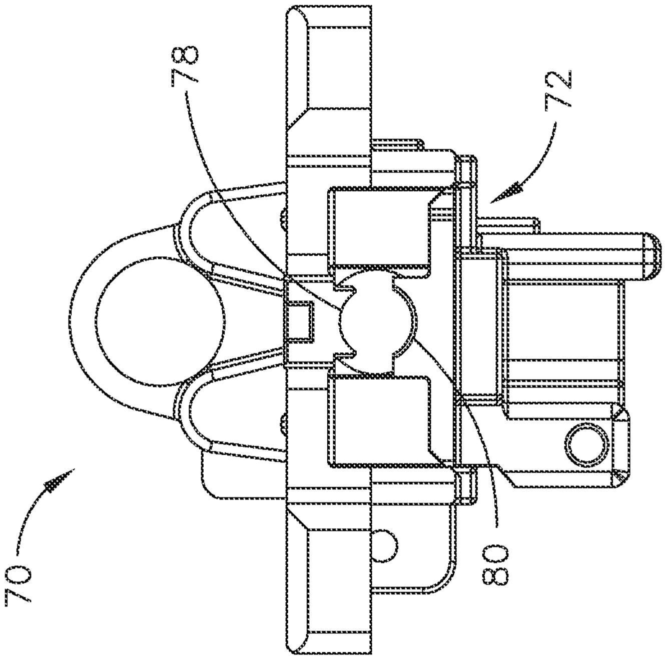
FIG. 30 is a rear elevation view of the front plate of the tool and the rear plate of the magazine of FIG. 1A.

Referring now to FIG. 30, the front plate 70 and the rear plate 72 are shown in a rear view without the driver 50. The driver track portion 78 and the driver track portion 80 direct the driver 50 during a drive stroke, and during a return stroke.

Figure 31:
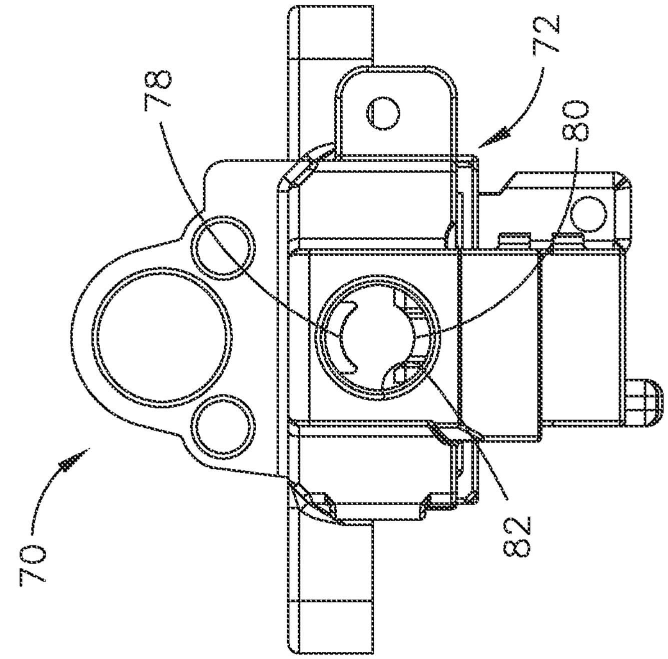
FIG. 31 is a front elevation view of the front plate of the tool and the rear plate of the magazine of FIG. 1A.

Referring now to FIG. 31, the front plate 70 and the rear plate 72 are shown in a front view without the driver 50. The opening 82 is depicted as slightly larger than the combined diameter of the curved driver track portion 80 and the curved driver track portion 78. Due to its larger diameter, the opening 82 does not typically contact the driver 50 during normal operations.

Referring now to FIG. 32, the tool 10 is depicted with the plurality of long fasteners 32 loaded in the magazine 12. These long fasteners 32 slightly protrude from the cutout portion 22 in the magazine 12. As mentioned above, the user grip 88 is preferably used (by a human user) when gripping the magazine 12, either for moving the tool 10, or holding the tool steady while driving a fastener into a workpiece, or for attaching/removing the magazine itself from the tool.

Referring now to FIG. 33, the tool 10 is depicted in a left side cutaway view with the plurality of long fasteners 32 loaded in the magazine 12. FIG. 33 depicts how far the long fasteners 32 protrude from the cutout portion 22.

Figure 34:
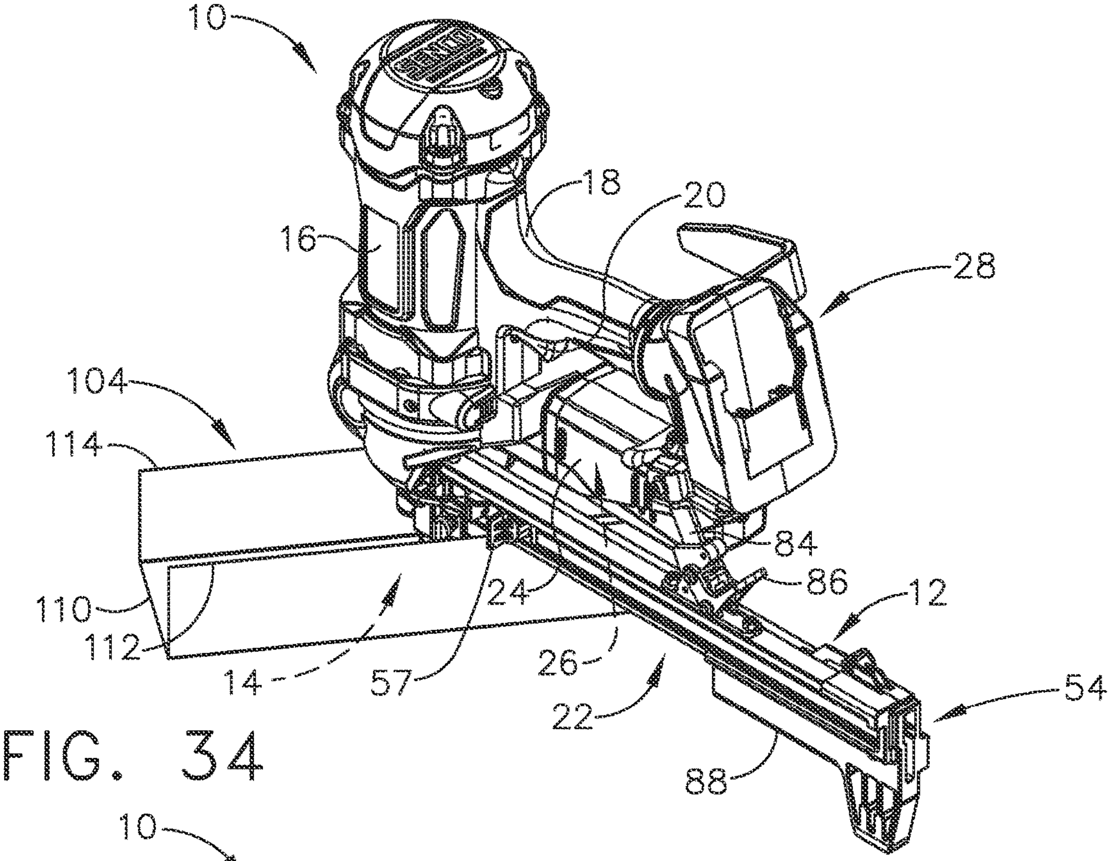
FIG. 34 is a top left perspective view of the tool of FIG. 1A, in which the tool is positioned partially inside a channel at a worksite.

Referring now to FIG. 34, the tool 10 is shown on a worksite, driving fasteners into a U-shaped channel 104. The exit end 14 is able to extend deep enough into the channel 104 to reach a horizontal base portion 110, due to the cutout portion 22 fitting over a first vertical portion 112 (also sometimes referred to herein as a "first vertical wall") of the channel 104. Of course, depending on the orientation of the jobsite, the tool 10 may also be able to fit over a second, opposite vertical portion 114 (also sometimes referred to herein as a "second vertical wall") of the channel 104. The first vertical wall 112 and the second vertical wall 114 are sometimes collectively referred to as the "two separated vertical walls."

Figure 35:
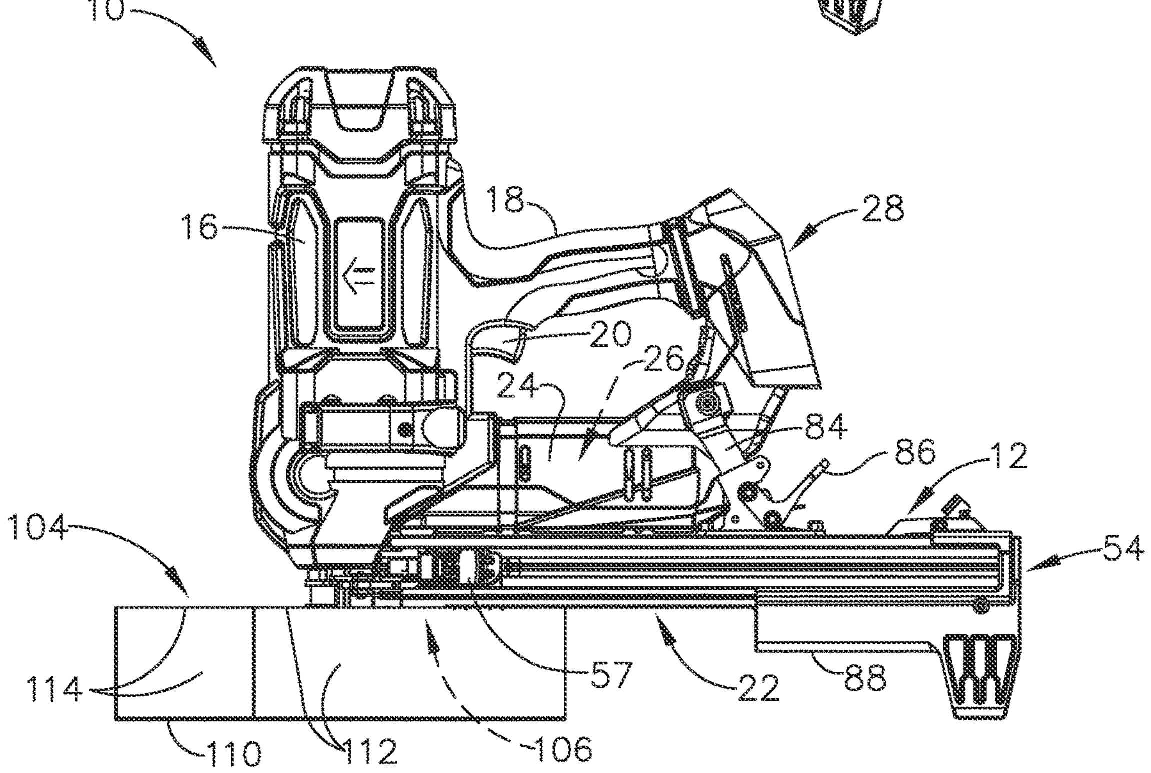
FIG. 35 is a left side elevation view of the tool of FIG. 1A, in which the tool is positioned partially inside a channel at a worksite.

Referring now to FIG. 35, the tool 10 is shown at work in the channel 104. In this view, the entire upper magazine cover portion 106 fits into the channel 104, along with the exit end 14 of the tool. FIGS. 34 and 35 depict the magazine 12 loaded with short fasteners 30, but long fasteners 32 can also be driven into the horizontal portion 110 using this same magazine. The cutout portion 22 is able to accommodate both types (sizes) of fasteners. Due to the length of the cutout portion 22, a user is also able to partially "swing" the tool 10 about a vertical axis along the exit end 14. In other words, the tool 10 can swing towards (in view of FIG. 34) the first vertical portion 112, or away (in view of FIG. 34)

from the first vertical portion 112. This allows the user more flexibility when working in tight spaces.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool, comprising:
an outer housing;
a working cylinder that includes a cylindrical sleeve and a movable piston therewithin;
a movable driver that is in mechanical communication with the movable piston, the movable driver having a direction of movement between at least a driven position and a ready position, the movable driver including an elongated cylindrical rod, the elongated cylindrical rod encompasses a majority of a total length of the movable driver, the movable driver including an outer rectilinear structure that at least partially surrounds the elongated cylindrical rod, wherein the outer rectilinear structure extends only a portion of a length of the elongated cylindrical rod; and
a guide body that includes a driver track and an exit end, where a fastener is to be driven, wherein: the driver track includes: a first curved portion and a second curved portion opposite the first curved portion, in which the first and second curved portions are sized and shaped to direct the elongated cylindrical rod during at least a driving stroke.

2. The fastener driving tool of claim 1, wherein: the movable driver has a first wing and a second wing, in which the first and second wings are on opposite sides of the movable driver and comprise the rectilinear structure of the movable driver, each of the first and second wings include a plurality of spaced-apart protrusions that are located at an outer portion of the first and second wings, wherein the plurality of spaced-apart protrusions acts as roller shafts for a plurality of rotatably-coupled rollers.

3. The fastener driving tool of claim 2, wherein:
the driver track includes:
a first side opening that guides the first wing;
a second side opening that guides the second wing;
in which there is a first gap between the first and second wings that creates the first side opening, and there is a second gap between the first and second wings that creates the second side opening.

4. A movable driver for use in a fastener driving tool, the movable driver comprising:
an elongated cylindrical portion that extends from a first end of the movable driver toward a second end of the movable driver along a centerline, the elongated cylindrical portion encompassing a majority of a total length of the movable driver, the elongated cylindrical portion including a first longitudinal side and a second longitudinal side that is opposite the first longitudinal side;
a first wing portion that extends along at least a portion of the first longitudinal side, the first wing portion having a first longitudinal outer edge;
a second wing portion that extends along at least a portion of the second longitudinal side, the second wing portion having a second longitudinal outer edge, the first wing portion and the second wing portion being in a plane, the first longitudinal outer edge being perpendicular to the plane, and the second longitudinal outer edge being perpendicular to the plane;
an interface portion proximal to the second end of the movable driver, the interface portion being in mechanical communication with the elongated cylindrical portion; and wherein:
the first wing portion includes a first, rear surface that is substantially parallel to the plane, and the second wing portion includes a second, rear surface that is substantially parallel to the plane; and
a first plurality of spaced-apart notches in the first, rear surface; and a second plurality of spaced-apart notches in the second, rear surface.

5. The movable driver of claim 4, further comprising:
a first plurality of spaced-apart protrusions that is positioned along at least a portion of the first longitudinal outer edge of the first wing portion, each of the first plurality of spaced-apart protrusions extending at a first protrusion angle that is parallel to the plane; and
a second plurality of spaced-apart protrusions that is positioned along at least a portion of the second longitudinal outer edge of the second wing portion, each of the second plurality of spaced-apart protrusions extending at a second protrusion angle that is parallel to the plane.

6. The movable driver of claim 5, wherein: a plurality of rollers, each of which is attached to at least one of the first and second pluralities of spaced-apart protrusions.

7. The movable driver of claim 4, wherein: the elongated cylindrical portion comprises a solid rod.

8. A magazine for use in a fastener driving tool, the magazine comprising:
an elongated body that includes a second end for receiving a plurality of fasteners, and a first end for sequentially dispensing the plurality of fasteners, the elongated body including a front side that extends between the first and second ends;
a fastener guide between the first end and the second end, the fastener guide being sized and shaped to allow a length of fasteners to pass therethrough; and
a fastener cover located along the front side of the elongated body, the fastener cover including an upper magazine cover portion, a gap portion, and a lower magazine cover portion, the upper magazine cover portion extending from the first end to the gap portion, the gap portion extending from the upper magazine cover portion to the lower magazine cover portion, and the lower magazine cover portion extending from the gap portion to the second end.

9. The magazine of claim 8, wherein: the lower magazine cover portion acts as a user grip, for securely holding the magazine while it is attached to a fastener driving tool.

10. The magazine of claim 8, wherein: the gap portion allows the magazine to be placed into limited space areas on a jobsite that have physical protruding objects.

11. The magazine of claim 8, further comprising:
a pusher to sequentially advance the plurality of fasteners within the fastener guide.

12. The magazine of claim 8, wherein: the fastener guide is sized and shaped:
(a) to allow a first type of fastener, having a shorter length, to pass therethrough, and
(b) to allow a second type of fastener, having a longer length, to pass therethrough.

13. A method of using a fastener driving tool to secure a U-shaped channel onto a substrate, the U-shaped channel exhibiting a horizontal base portion and two separated vertical walls, the method comprising:
providing a fastener driving tool comprising:
an outer housing including a fastener exit end;
a working cylinder that includes a cylindrical sleeve and a movable piston therewithin;
a movable driver that is in mechanical communication with the movable piston at least during a driving stroke, the movable driver having a direction of movement between at least a driven position and a ready position;
providing a magazine for use with the fastener driving tool, the magazine comprising:
an elongated body that includes a first end for sequentially dispensing a plurality of fasteners, and a second end for receiving the plurality of fasteners, the elongated body including a front side that extends between the first and second ends;
a fastener guide between the first end and the second end, the fastener guide being sized and shaped to allow a length of the plurality of fasteners to pass therethrough;
a fastener cover located along the front side of the elongated body, the fastener cover including an upper magazine cover portion, a gap portion and a lower magazine cover portion, the upper magazine cover portion extending from the first end to the gap portion, the gap portion extending from the upper magazine cover portion to the lower magazine cover portion, and the lower magazine cover portion extending from the gap portion to the second end;
positioning the fastener exit end between the two separated vertical walls;
positioning the gap portion over one of the two separated vertical walls;
pushing the fastener exit end against the horizontal base portion; and
driving one of the plurality of fasteners through the U-shaped channel and into the substrate.

14. The method of claim 13, further comprising:
a lifter that is configured to move the movable driver toward the ready position;

a storage chamber that is in fluidic communication with the working cylinder, the storage chamber being charged with a pressurized gas; and the pressurized gas causing the movable piston to move through a driving stroke toward the driven position, wherein the pressurized gas is not vented to atmosphere after the driving stroke, but instead the pressurized gas is re-used for a plurality of operating cycles.

15. The method of claim 13, wherein: the lower magazine cover portion acts as a user grip, for securely holding the magazine.

* * * * *